Figure 1:
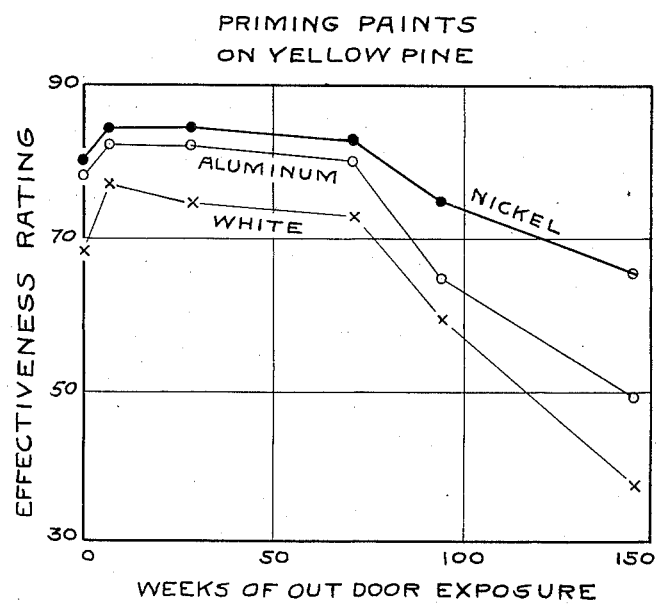
Figure 2:
Figure 3:
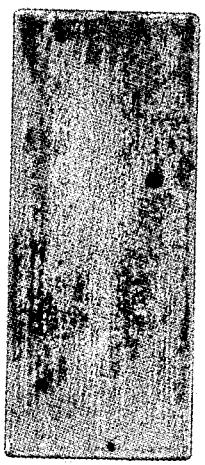
Figure 4:
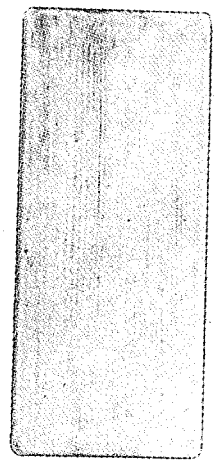
Figure 5:
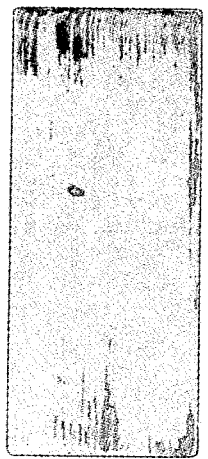
Figure 6:
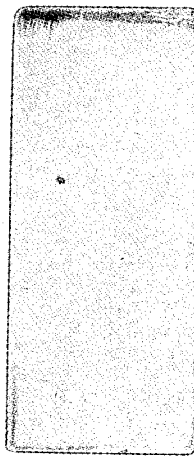
Figure 7:
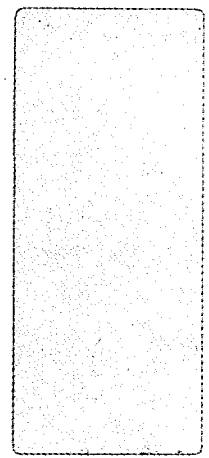
Figure 8:
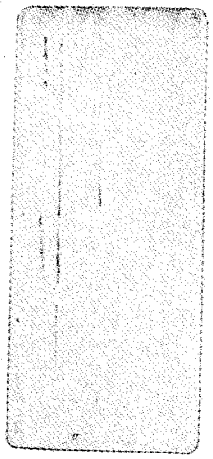
Figure 9:
Figure 10:
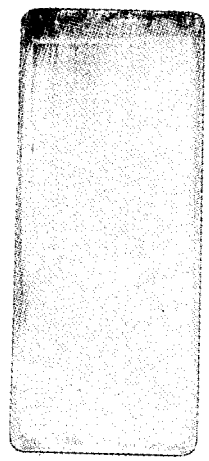
Figure 11:
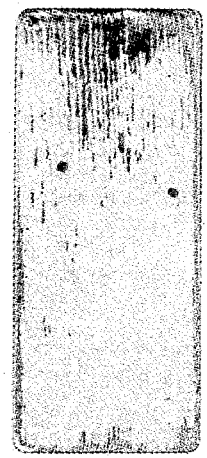
Figure 12:
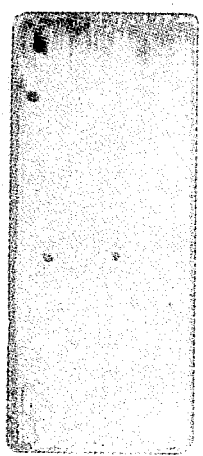
Figure 13:
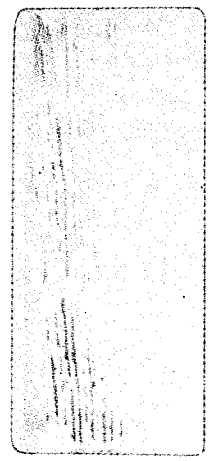

Dec. 19, 1944.         N. B. PILLING ET AL         2,365,356
                    NICKEL ELECTROFLAKE PIGMENT
                    Filed July 15, 1941        4 Sheets-Sheet 1

INVENTORS
NORMAN BODEN PILLING
ANDREW WESLEY
BY
ATTORNEY

INVENTORS
NORMAN BODEN PILLING
ANDREW WESLEY
ATTORNEY

INVENTORS
NORMAN BODEN PILLING
ANDREW WESLEY
BY
ATTORNEY

Dec. 19, 1944.   N. B. PILLING ET AL   2,365,356
NICKEL ELECTROFLAKE PIGMENT
Filed July 15, 1941   4 Sheets-Sheet 4

FRANGIBLE
ELECTROFLAKE NICKEL
(AS REMOVED FROM CATHODE 100x)

FRANGIBLE
ELECTROFLAKE NICKEL
(AFTER BRUSHING THROUGH
325-MESH SCREEN 100 x)

INVENTORS
NORMAN BODEN PILLING
ANDREW WESLEY
BY
ATTORNEY

Patented Dec. 19, 1944

2,365,356

UNITED STATES PATENT OFFICE 2,365,356

NICKEL ELECTROFLAKE PIGMENT

Norman Boden Pilling, Westfield, and Andrew Wesley, Plainfield, N. J., assignors to The International Nickel Company, Inc., New York, N. Y., a corporation of Delaware Application July 15, 1941, Serial No. 402,550
In Canada January 21, 1941

4 Claims. (Cl. 106—290)

The present invention relates to electroflake-nickel and metallic paints, inks and the like, containing electronickel in the form of flake.

Metallic paints or bronzes have been known to the arts for many years and were originally used for decorative purposes. Among such paints may be enumerated those in which the pigment consists primarily of copper, tin, bronze and aluminum. However, in recent years it has become recognized that some of these materials also had utilitarian value as priming coats for wood and as protective media although certain drawbacks and limitations were also apparent. In recent years probably the most popular metallic paint has been that prepared from aluminum flake generally called aluminum bronze.

Aluminum paints have been accepted by the trade because of several advantages which they possess in comparison to other previously known metallic paints. Aluminum paints, for example, not only are effective as top coats but have been considered as an especially effective primer for use on wood. In addition, aluminum paints provide a durable coating giving effective protection to the base material for a considerable time. As is recognized in the industry, aluminum paints have a high opacity to light, and, in addition, the moisture-proofing efficiency of aluminum paints is also quite high.

Aluminum flake has limitations due apparently to corrosion, alkalis being particularly destructive, and chlorides are also detrimental, while copper and bronze flake has been found to be particularly vulnerable to atmospheric exposure, perhaps in part, due to reaction with the organic vehicle and in addition the resulting soluble corrosion products will stain adjacent white paint. The color and high reflectivity of aluminum flake paints, while sometimes desirable, are limitations for other uses where the bluish-white color and glare characteristic of this pigment are definitely objectionable.

Nickel has high corrosion resistance and is particularly resistant to alkalis and brine and it has been discovered that when it is produced in the form of flake it offers definite advantages over previously known metallic pigments, particularly where exposure to outdoor atmospheric conditions is involved or where acids or alkalis are present, and also where a subdued color is required. By special methods nickel flake of appropriate fineness, thinness and leafing characteristics can be produced, which can be mixed with suitable vehicles and applied by usual methods including brushing, spraying or printing, and which gives results not heretofore attainable with the best aluminum flake paints. When applied to wood this new nickel flake paint has been found to yield an attractive grey finish which long-continued practical tests have shown to afford superior protection to the wood, very low moisture permeability and to yield an excellent base for various types of paint.

The neutral gray, highly corrosion resistant finish produced by nickel flake paint is particularly desirable in marine service including use for camouflage. The superior resistance of nickel flake to wear and its resistance to corrosion from calcium chloride make it a desirable component of road marking paints.

The corrosion resistance of nickel is well known and the question naturally arises as to why nickel flake has not been used in paint. The reason appears to be the great toughness of ordinary nickel which makes the mechanical production of flake of appropriate dimensions too costly to be commercially useful. We have investigated various methods for producing nickel flake in an effort to reduce the cost to a commercial level and have invented an electrolytic method by which nickel flake can be produced readily and economically. In this process nickel is deposited from special electrolytes and under special conditions, whereby nickel is produced sufficiently thin to be useful.

In addition to providing a nickel flake having special characteristics, we have also discovered that improved results can be obtained by using a promoter agent in addition to a leafing agent such as stearic acid to improve the qualities of our unique nickel flake.

It is an object of the present invention to provide a means for producing nickel in the form of novel flakes of suitable thinness and lateral dimension.

It is another object of the present invention to provide a means for producing nickel in the form of novel flakes of suitable thinness, a large portion of said flakes so produced having such lateral dimensions as to obviate the necessity for further sub-division.

It is a further object of the present invention to produce nickel flake by electrolysis of a special electrolyte to provide novel electroflake nickel of suitable thinness, a large portion of which being leaf-like particles which may be brushed through a 325-mesh screen.

The present invention also contemplates providing nickel paints having qualities superior to those of the best aluminum paints now available to industry and of a pleasing color substantially free from the bluish color of aluminum, and of sufficiently lower visual reflectivity to be suitable for application where aluminum is unsuitable, wherein novel electroflake nickel of suitable thinness and lateral dimensions is incorporated.

It is likewise within the contemplation of the present invention to provide nickel inks of high quality having as a primary source of nickel the novel electroflake nickel of the present invention.

It is also the purpose of the present invention to provide a nickel pigment component the particles of which have special characteristics.

Among the further purposes of the present invention is the provision of nickel pigments the particles of which are very thin electroflakes having a thickness of less than 0.00008 inch, substantially all of which pass a 325-mesh screen.

Figure 14:
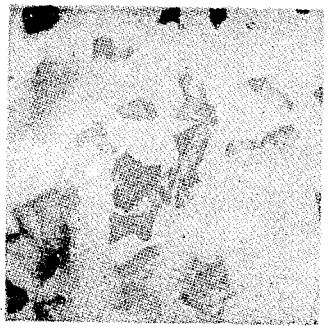
Figure 15:
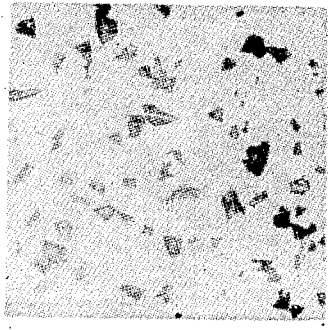

Other objects and advantages will become apparent from the following description taken in conjunction with the drawings of which Fig. 1 is a graph showing the effectiveness rating of the novel electroflake nickel paint as compared to aluminum paint and white paints, Figs. 2 to 13 are reproductions of photographs of test panels, Fig. 14 is a reproduction of a photomicrograph taken at an enlargement of 100 diameters of novel frangible electroflake nickel of the present invention as removed from the cathode; and Fig. 15 is a reproduction of a photomicrograph taken at an enlargement of 100 diameters of novel frangible electroflake nickel of the present invention after removing from the cathode and brushing through a 325-mesh screen.

Broadly stated, the present electroflake nickel provides a nickel paint, for example, suitable as a priming coat or as a finishing coat or one which can be used equally well as both priming coat and finishing coat or coats. In addition to being suitable for ordinary protective purposes, excellent water and corrosion resistant paints may be formulated by using vehicles of appropriate types. Furthermore, by the use of properly formulated nickel inks, it is possible to provide the art with magnetically actuated articles of light weight. Moreover, our novel nickel paint may be used solely for its decorative value and printing inks can also be prepared.

Our novel nickel paints prepared as they are from a nickel electroflake having special characteristics have a number of distinctive properties among which may be noted their protective value, their corrosion resistance, their magnetic properties and their resistance to moisture including marine atmospheres and alkaline environments.

Electroflake nickel paint has a higher protective value than the best aluminum paints. When used as a priming coat on different types of wood such as red cedar, Douglas fir and yellow pine, electroflake nickel paints yield a more durable film than does even aluminum paint and are far more durable than copper or bronze paints and produces films of extremely low moisture permeability. It is recognized by the experts that yellow pine is a severe test of the effectiveness of a paint. As those skilled in the art readily understand "effectiveness rating" is a ratio used by the Forest Products Laboratory, Madison, Wisconsin to express the resistance of paint coatings on wood to the passage of moisture through them. If A=moisture absorbed by a bare wood panel and B=moisture absorbed by a painted panel under certain standard conditions of humidity and temperature, the effectiveness rating is defined as $$\frac{A-B}{A}\times 100$$

In order to compare the effectivenss of the novel electroflake nickel paint with standard aluminum paint and standard white paints such as those containing white lead or white lead and zinc oxide or zinc oxide and lithopone and the like as pigments, respective panels of yellow pine were given priming coats of the various paints and then top coats of four different white paints. The metallic paints, i. e., the paints with aluminum or electroflake nickel as the pigment, were prepared in such a manner as to provide approximately the same number of particles of metal per gallon of paint. To meet this condition it was necessary to suspend about 4 to 6 pounds of electroflake nickel in a gallon of vehicle and 2 pounds of aluminum per gallon of varnish. As will be readily appreciated by examination of Fig. 1, electroflake nickel and aluminum are approximately equally effective as priming paints for approximately one year and both are far superior to the common white paints. After a year's exposure to the weather the effectiveness of all three types of paints decreases, the effectiveness of the aluminum priming paint and the white priming paints dropping off much more rapidly than the effectiveness of the electroflake nickel priming paint until at the end of about 3 years electroflake nickel has an effectiveness of about 67%, whereas aluminum has an effectiveness slightly less than 50%, and white paints have an effectiveness of about 35 to 36%. This clearly demonstrates that electroflake nickel paint as a priming coat is superior to aluminum paints or conventional white paints as determined by the standard permeability test. Similar results have been obtained in the coating of red cedar panels.

To assist in the appreciation of the value of electroflake nickel paint as a priming coat the reproductions of photographs of test panels are provided herewith as Figs. 2 to 13.

The control panels were painted with priming coats of standard grade pigment in a standard formula vehicle. The topcoats of all panels were standard grade for each type of topcoat. The priming coats of electroflake nickel were formulated in accordance with the composition noted hereinafter. All panels were exposed to the atmosphere of an industrial district at an angle of 45° facing south. Thus, the only uncontrolled variables were the innate characteristics of the pigmenting material.

The photographs, reproductions of which are Figs. 2 to 13, were taken after the test panels had been exposed as described hereinbefore for 155 weeks.

To facilitate interpretation of these reproductions it is most convenient to divide them into four groups as follows:

Group I

| | Fig. No. | | |
|---|---|---|---|
| | 2 | 3 | 4 |
| Priming coat | White lead | Electroflake Ni[1] | Aluminum. |
| 2 top coats of | ----do---- | White lead | White lead. |

Group II

| | Fig. No. | | |
|---|---|---|---|
| | 5 | 6 | 7 |
| Priming coat | White lead—ZnO. | Electroflake Ni[1] | Aluminum. |
| 2 top coats of | ----do---- | White lead—ZnO | White lead—ZnO. |

Group III

| | Fig. No. | | |
|---|---|---|---|
| | 8 | 9 | 10 |
| Priming coat | ZnO—lithopone. | Electroflake Ni[1] | Aluminum. |
| 2 top coats | ----do---- | ZnO—lithopone | ZnO—lithopone. |

Group IV

| | Fig. No. | | |
|---|---|---|---|
| | 11 | 12 | 13 |
| Priming coat | BaSO₄ filler | Electroflake Ni[1] | Aluminum. |
| 2 top coats | ----do---- | BaSO₄ filler | BaSO₄ filler. |

[1] Electroflake Ni=novel electrolytic nickel flakes of the present invention.

For purposes of comparison it is manifest that the panels of each group can only be compared with the panels of the group not with the panels of other groups. Starting with Group I in which two top coats of white lead were applied over different priming coats, it is apparent that at the end of 155 weeks the white lead priming coat is far inferior to the electroflake nickel priming coat and that electroflake nickel is also superior to aluminum as a constituent of a priming coat.

The panels of Group II when compared with each other tell the same story of the relative superiority of nickel over white lead-zinc oxide or aluminum for priming coats.

The relative superiority of a nickel priming coat over zinc oxide-lithopone, barium sulfate or aluminum is brought out in a striking manner by a mutual comparison of the panels in Group III and a similar comparison of the panels in Group IV.

A study of Fig. 14 makes possible the appreciation of the visible characteristics of the novel electroflake nickel. It is apparent upon inspection of the reproduction of the photomicrograph (Fig. 14) of the novel electroflake nickel that many of the particles clearly have a curled shape resulting from the stresses set up in the deposit during electrodeposition. The longitudinal edges of the particles are curled toward the longitudinal axis of the particles. Furthermore, it will be observed that all of the particles of the novel electroflake nickel are of irregular shape. This is in distinct contrast to Edison electrolytic nickel which comprises particles of regular shape resulting from cutting the deposit in strips and cutting the strips normal to the longitudinal axis of the strip to obtain squares. A consideration of Fig. 15 taken at the same magnification as Fig. 14 leads to the appreciation of the fact that after brushing through a 325-mesh screen most of the particles have a scale-like character and have lost the curled appearance so characteristic of the particles of Fig. 14. It is noteworthy that reduction of the particles removed from the cathode to a size such that 90+% of the particles pass a 325-mesh screen does not require the use of grinding mills capable of exerting relatively severe force upon the particles. The particles of novel electroflake nickel are so frangible that the relatively gentle force exerted by the hand through a brush is sufficient to reduce the particles of novel electroflake nickel from an average size of about 40-mesh to 90+% minus 325-mesh.

As a corrosion resistant material it is recognized by the experts in the art that aluminum suffers in comparison with nickel when exposed to a wide variety of corrosive media. For example, aluminum is readily attacked by alkaline media. On the other hand, nickel is extremely resistant to corrosion by alkali. This is very important because it is well known that the cleaning compounds used in washing painted surfaces practically all have an alkaline base. Similarly, when aluminum paint is applied to concrete or freshly mortared surfaces, blisters soon form due to the reaction of aluminum flakes with the alkaline media to produce hydrogen gas. In distinct contrast to this drawback of aluminum paints, nickel paints, and especially those having the unique characteristics set forth more fully hereinafter, are practically untouched by the alkaline media of concrete or freshly mortared surfaces. This is particularly true when the nickel paints are prepared by incorporating the special electroflake nickel powder of the present invention in a vehicle which itself is resistant to decomposition by alkaline media.

As all experts know, nickel is moderately magnetic. Advantage can be taken of this characteristic to provide magnetically actuated articles of light weight for use in various mechanisms dependent upon such operation, such as in maintaining registration in printing processes and the like. For example, a thin paper sheet or a thin strip of cardboard can be readily coated with electroflake nickel or records may be stamped with an electroflake ink and used in conjunction with electromagnetic pick-up provided to record or transcribe said records. Painted or printed material similar to the aforementioned may likewise be used for magnetic shielding.

Moisture permeability tests on red cedar and yellow pine panels have clearly shown that films of electroflake nickel paint are highly resistant to the passage of moisture. During the investigations necessary to develop and test the novel electroflake nickel paint described herein, the covering power, effectiveness, and similar characteristics of the novel electroflake nickel paint were compared with similar properties of conventional paints including aluminum paints and the common white paints. These investigations, including exposure tests for long periods of time, moisture permeability tests, and similar standard tests, have clearly shown that electroflake nickel paint is generally at least equal to, and in many instances, far superior to aluminum paint. Moisture permeability tests were carried out in accordance with the standard procedure on red cedar and yellow pine.

As all experts in the art recognize, yellow pine is a wood which is very difficult to protect and as has been clearly pointed out hereinabove, aluminum paints and white paints fail rapidly to protect yellow pine from moisture after an exposure to the weather of about one year. On the other hand, for priming yellow pine, the novel electroflake nickel paint of the present invention is clearly superior to other paints providing an effective priming coat. In view of the effectiveness with which the novel electroflake nickel paint protects yellow pine, it will be readily appreciated by the experts in the art that the novel electroflake nickel paint is equally effective in protecting other wood. This property of our novel electroflake nickel paints containing our novel electroflake nickel powder having unique characteristics more thoroughly described hereinafter can therefore be used to coat moisture-permeable material suitable as wrappings or containers to make such materials impermeable to moisture. In this manner material suitable for wrapping of foodstuffs, for example, can be provided at a much lower cost by coating the outside of each wrapper with nickel electroflake than when such wrappings are constituted of tin or aluminum foils, and in addition, contact of foodstuffs does not cause discoloration such as occurs with the materials now available to the trade. An example of this deficiency of aluminum foil is the reaction which occurs between ordinary salt and aluminum. As a result of this reaction between ordinary salt and aluminum, aluminum foil is not suitable for use in wrapping cheese due to the salt content thereof.

In recent years aluminum foil has received some recognition as a coating for the surfaces of fire-proof bulkheads because of its high reflectivity for radiant heat. However, aluminum foil for this purpose suffers from a serious drawback in comparison with nickel. Nickel painted surfaces have a high radiant heat reflectivity and, in addition, nickel has a much higher melting point than aluminum and is better suited for use in formulating high temperature paints than other available metallic pigment and may be used with alkaline inorganic binders such as water glass and the like.

We have found that to obtain satisfactory results care must be exercised in employing particles of nickel of a particular shape and to use nickel powder of a particular size and thickness and in selecting the proper vehicle. In addition to the foregoing, it is necessary to employ a leafing agent and, in fact, particularly satisfactory results are obtained by using a promoting agent or promoter in addition to a leafing agent. It has been found that satisfactory nickel paints may be compounded from nickel powder, the major portion of the flakes being of electro-nickel passing a 325 mesh screen and having a thickness not greater than about $0.00008$ $(8 \times 10^{-5})$ inch. However, it is preferred to employ electroflake nickel powder, the particles of which have been reduced by mechanical working, such as impact grinding for several days to a thickness of about $0.000037$ $(37 \times 10^{-6})$ inch, while particles of flake nickel having a thickness less than $0.000037$ $(37 \times 10^{-6})$ inch probably would provide a suitable pigment material, the production of particles of such accentuated thinness is not commercially practicable. Furthermore, it is preferred to use nickel powder having particles of such size that more than 90% of the powder, for example 99+%, passes a 325 mesh screen. While preferred results have been obtained with electroflake nickel powder of the foregoing state of fineness, satisfactory results have also been obtained when employing nickel powder of which 15 to 20% was retained by a 325 mesh screen.

A large amount of film or flake nickel for use in accumulators has been produced by the Edison process disclosed notably in U. S. Patents Nos. 821,626; 865,687; 865,688; and 936,525. However, these flakes usually are squares having sides about $\frac{1}{16}$ of an inch long and of undefined thickness. Furthermore, the nickel flake produced by the Edison process is ductile or tough. At least two factors operate to the disadvantage of the Edison process for producing films or flakes of nickel when considered for the production of nickel flake for paints, inks and the like. First, the Edison process is costly per se. Secondly, the particles so produced are too large for use in paints and the like without further subdivision. Thirdly, the nickel is tough. Therefore to subdivide such tough material requires an uneconomical expenditure of energy. For use in accumulators the problem of further subdivision is not encountered but in the formation of paints the lateral dimensions of the flakes are as important as the thinness of the flake. These disadvantages inherent in the Edison process in relation to the production of nickel flake for pigmenting purposes are avoided by use of the process of the present invention for the production of the novel electro-flake nickel involving novel electrolytes, special conditions, special cathodes and other features of the present invention to provide novel nickel electroflakes of irregular shape, of critical thinness and, to a great extent, of critical lateral dimensions as an immediate product of electrodeposition. In order that those skilled in the art may have a better understanding of the principles of the present invention, the following illustrative examples are provided as a guide to the preparation of the novel electroflake nickel for use in formulating nickel paints, varnishes, lacquers and inks in accordance with the principles of the present invention.

The novel electroflake nickel of the present invention is prepared by electrodeposition from special electrolytes, under critical conditions to provide a powder which when removed from the cathode comprises flakes about 90% of which can be brushed through a 325-mesh screen. The deposit is produced under conditions such that the nickel deposit is sufficiently brittle or frangible to crack and to peel spontaneously. Under the critical conditions of the present process the nickel electroflake deposition does not build up to a thickness greater than about $0.00004$ $(4 \times 10^{-5})$ inch. In order that the maximum thickness of the flakes shall not exceed above $0.00004$ $(4 \times 10^{-5})$ inch the deposit is removed from the cathode by hitting the cathode at intervals not greater than about two minutes or by using a rotating drum giving a similar cycle. The deposit cracks and peels into electroflakes which are so frangible that a large proportion can be brushed through a 325-mesh screen to yield flakes of such dimensions as to make the novel electroflakes suitable for use in paints, varnishes and the like without further subdividing.

In order to produce the novel electroflake nickel of the present invention it is most satisfactory to use metals which do not contaminate the solution and to which the deposit only adheres feebly as cathodes. With such cathodes it is possible to obtain flakes of the minimum thickness which are readily removed from the cathode by brushing.

The electrodeposition is carried out while the temperature of the bath is maintained within a critical range. It has been found satisfactory to maintain the temperature of the electrolyte between about 10° and about 20° C. and preferably at about 15° C. The cathode current density is regulated so as not to exceed about 40 amperes per square foot nor to fall below about 20 amperes per square foot with a preferred cathode current density of about 25 amperes per square foot of cathode area. Too high current densities or too low temperatures yield a burned powdery deposit while too low current densities or too high temperatures lead to excessive adherence to the cathode and inadequate frangibility.

The novel electroflake nickel may be produced in electrolytes in which insoluble anodes are employed or the novel electroflake may be produced in electrolytes in which soluble anodes are employed. However, in either case cathodes of metal not contaminating the electrolyte to which the deposit adheres but feebly and from which the deposit may be readily removed after cracking are employed. Cathodes made of a metal or metals having a tendency to form protective oxide film to which the electrodeposited metal adheres feebly and selected from the group comprising aluminum and tantalum, a high nickel alloy containing about 80% nickel, about 14% chromium, and the balance iron and minor constituents and impurities and sold under the tradename "Inconel," a steel alloy containing about 18% chromium and about 8% nickel and commonly known as "stainless steel," and the like have given satisfactory service.

As illustrative of an electrolyte for use in conjunction with insoluble anodes the following bath has given satisfactory results:

Grams per liter
$NiSO_4.(NH_4)_2SO_4.6H_2O$ _____ About 100
$NH_4OH$ _____ About 137

Anodes: Nickel or other conductors insoluble in the electrolyte at the temperature and current densities described hereinbefore.

Typical of the electrolytes for use in conjunction with soluble nickel anodes is the following composition:

Grams per liter
$NiCl_2.6H_2O$ _____ About 60
$NH_4Cl$ _____ About 14
$NH_4OH$ _____ About 137

Of course it will be appreciated by those skilled in the art that buffers may be employed to maintain the pH within the range of 9 to 11. Likewise small amounts of other nickel salts may be added although the major source of the nickel of the bath be the nickel chloride or nickel sulphate complexes with ammonia.

While the foregoing examples are illustrative of bath compositions which have given highly satisfactory results electrolytes having the following ranges of composition are satisfactory:

*For insoluble anodes*

Grams per liter
$NiSO_4.(NH_4)_2SO_4.6H_2O$ ___ About 25 to about 180
$NH_4OH$ _____ About 35 to about 240

*For soluble anodes*

Grams per liter
$NiCl_2.6H_2O$ _____ About 15 to about 75
$NH_4Cl$ _____ About 4 to about 20
$NH_4OH$ _____ About 35 to about 170

The second bath is preferable from a practical standpoint as it is self-maintaining, whereas continuous additions are required in the first bath which lead to the accumulation of excessive quantities of salt which would require scrapping the bath after some use.

The novel electroflake nickel produced in these baths has substantially the same characteristics and is used with equally satisfactory results whether from one bath or from the other.

As noted hereinbefore, electroflake nickel powder having an average particle thickness of $0.00008$ ($8 \times 10^{-5}$) inch may be employed in the preparation of nickel paint. However, it is preferred to use an electroflake nickel having an average particle thickness of about $0.000037$ ($37 \times 10^{-6}$) inch and of such a state of fineness that 99% of the powder will pass through a 325-mesh standard sieve. In order to obtain good leafing, it is necessary to incorporate a leafing agent such as stearic acid. The leafing agent may be incorporated in the solid form or dissolved in a suitable solvent such as a petroleum oil, for example, a fraction boiling between about 300° F. and about 400° F. It has been found that quite satisfactory leafing can be obtained by supplementing a leafing agent such as stearic acid with a promoter such as aluminum stearate. The quantities of leafing agent and promoter may be varied and amount to as much as 3% of each, but we have found about 1% of stearic acid to give good results and 1% of stearic acid with about 1% of aluminum stearate is also good.

In preparing a nickel paint for general protective purposes it has been found that the quantity of electroflake nickel pigment may be varied between about two pounds and about six pounds per gallon. However, it is preferred to incorporate about 3 pounds to about 4 pounds of flake nickel pigment in a gallon of vehicle and if desirable or necessary, thin with some diluent such as pure mineral spirits. As an example of a composition which has given satisfactory results, the following is provided:

3 pounds of special nickel pigment,
99% through 325 mesh standard sieve,
Particle thickness not greater than 0.00008 inch
One gallon of spar varnish.

The varnish should be one meeting the specifications for outdoor use and should be clear and transparent. The viscosity of the vehicle should be between about 0.50 and 1.0 poise at 25° C. The acid number should be less than 15 based on the non-volatile content of the varnish. It should not contain less than about 50% by weight of non-volatile oils and gums and should pass a 60% Kauri reduction test. When mixed with a suitable amount of special flake nickel pigment, the paint should have a good leafing quality, satisfactory brushing and leveling properties, and should not break or sag when applied to a vertical smooth surface. In addition, the paint should set to touch in not less than an hour nor more than 6 hours and dry hard and tough in not more than 24 hours at room temperature. It has been found preferable to add the vehicle to the special flake nickel pigment containing a leafing agent and a promoter such as aluminum stearate.

Water and alkali resistant paints may be prepared from a water and alkali-resistant vehicle and the special electroflake nickel pigment. It has been found that satisfactory results can be obtained by using the special electroflake nickel pigment in the proportion of about 2 pounds of special flake nickel pigment to about one gallon of such a water and alkali resistant product as chlorinated rubber. Various chlorinated rubber vehicles are accessible to industry among which are those manufactured by the National Insulating Company under the trade name "INSL.-X."

A decorative nickel ink may be produced in accordance with the following formula:

70 grams of special flake nickel pigment
100 milliliters of spar varnish and sufficient thinner such as kerosene to provide an ink of suitable viscosity.

In general it has been found that 50 milliliters of kerosene give satisfactory results.

A nickel paint suitable for application to metal surfaces such as automobile bodies and the like may be compounded from the following vehicle in proportions similar to those given hereinafter. For the priming coat 1 pound of special electroflake nickel pigment is mixed with 1 gallon of a suitable lacquer vehicle such as that provided to the trade under the trade-mark "Roxaline No. 4917." The succeeding coats, such as three coats, may be applied on the priming coat using half a pound of special electroflake nickel pigment per gallon of lacquer.

In a manner similar to that described in the foregoing, metallic objects may be provided with a nickelous film. A lacquer containing electroflake nickel prepared as described hereinabove may be sprayed upon the surface of a body which is to be provided with a nickel coating or plating and the painted object subjected to a heat treatment at a temperature below the melting point of the core body but sufficiently high to substantially completely eliminate all the vehicle either by volatilization or decomposition without leaving a residue. It is essential that the heat treatment be carried on in an inert atmosphere or in an atmosphere of a reducing gas in order to avoid oxidation. After the heat treatment the heat treated coated body is then worked, for example, by rolling and a substantially continuous film of nickel obtained or the material may be rolled in a non-oxidizing atmosphere to effect a good bond. Alternatively the steel may be given a thin copper plate then be coated with nickel flake lacquer and heated to fuse said copper layer thus thoroughly bonding the nickel flake coating. The heat treated and worked painted object may then be subjected to cold working such as rolling to improve the structure of the protective film and enhance the adherence of the protective film to the core body. In the event that films thicker than those which may be obtained by the application of one film of paint are desirable or necessary, suitable coatings may be applied to the article in a manner similar to that described hereinbefore, the painted object being heat treated and worked after each successive application of the paint film.

Although the present invention has been described in conjunction with preferred embodiments thereof, it is to be understood that variations and modifications thereof can be made as those skilled in the art will readily appreciate. Such variations and modifications are to be considered within the purview of the specification and the scope of the appended claims. Thus it will be appreciated that when the electrodeposited flakes are not of desired thinness the flakes may be reduced in a known manner. Similarly, the portion of the electroflakes which, as recovered from the cathode, does not pass a 325-mesh screen may be reduced in known manner if desired.

We claim:

1. As a new article of manufacture, substantially pure, electro-deposited nickel in the form of small irregularly shaped flakes about $2 \times 10^{-5}$ inch to about $4 \times 10^{-5}$ inch thick, said electrodeposited nickel being so brittle that flakes of an average size of about 40-mesh are reduced to $90+\%$ minus 325-mesh by relatively gentle force exerted by the hand in brushing said 40-mesh particles through a 325-mesh standard screen.

2. As a new article of manufacture, frangible nickel in finely divided form, said nickel being substantially pure electro-deposited nickel in the form of irregularly shaped flakes about $2 \times 10^{-5}$ inch to about $4 \times 10^{-5}$ inch thick, said irregularly shaped nickel flakes having been derived from an electro-deposit of nickel by cracking and peeling of said deposit from a cathode and the flakes obtained by said peeling and cracking being so frangible that about 90% of said flakes may be reduced to minus 325-mesh particles by brushing through a 325-mesh standard screen.

3. As a new article of manufacture, a nickel paint comprising about 2 pounds to about 6 pounds per gallon of vehicle of irregularly shaped substantially pure electro-deposited electroflake nickel particles, said irregularly shaped electroflake nickel particles having an average particle thickness of not more than about $8 \times 10^{-5}$ inch and not less than about $2 \times 10^{-5}$ inch, at least about 90% of said irregularly shaped electroflake nickel particles passing a 325-mesh standard screen and said irregularly shaped electroflake nickel particles having been derived from an electro-deposit of nickel by peeling and cracking from a cathode, the nickel flake so derived being so frangible that about 90% can be reduced to pass a 325-mesh standard screen by brushing through said standard screen.

4. As a new article of manufacture, a nickel paint comprising about 1 to about 4 pounds per gallon of vehicle of irregularly shaped electroflake nickel particles, about $2 \times 10^{-5}$ inch in thickness, of which particles at least about 90% pass a 325-mesh standard screen, said particles having been derived from an electro-deposit of substantially pure nickel by peeling and curling from a cathode and the particles of nickel so obtained being so frangible that about 90% of the particles so obtained can be reduced to minus 325-mesh by brushing through a 325-mesh standard screen, and said vehicle having a viscosity at 25° C. between about 0.50 and about 1.0 poise and having not less than about 50% by weight non-volatile oils and gums.

NORMAN BODEN PILLING.
ANDREW WESLEY.